United States Patent
Venanzoni et al.

(10) Patent No.: US 12,350,125 B2
(45) Date of Patent: Jul. 8, 2025

(54) DENTAL IMPLANT AND DENTAL PROSTHESIS

(71) Applicant: TRI Dental Implants Int. AG, Huenenberg (CH)

(72) Inventors: Sandro Venanzoni, Zürich (CH); Rafael Perez, Freiburg (DE); Holger Kast, Huenenberg (CH); Ronald Jung, Herrliberg (CH)

(73) Assignee: TRI Dental Implants Int. AG, Huenenberg (CH)

( * ) Notice: Subject to any disclaimer, the term of this patent is extended or adjusted under 35 U.S.C. 154(b) by 703 days.

(21) Appl. No.: 17/388,217

(22) Filed: Jul. 29, 2021

(65) Prior Publication Data

US 2021/0353392 A1 Nov. 18, 2021

Related U.S. Application Data

(63) Continuation of application No. PCT/EP2020/055170, filed on Feb. 27, 2020.

(30) Foreign Application Priority Data

Feb. 28, 2019 (DE) .................. 10 2019 105 182.7

(51) Int. Cl.
*A61C 8/00* (2006.01)

(52) U.S. Cl.
CPC .......... *A61C 8/0051* (2013.01); *A61C 8/0022* (2013.01); *A61C 8/0059* (2013.01); *A61C 8/0062* (2013.01)

(58) Field of Classification Search
CPC ......... A61C 8/00; A61C 8/005; A61C 8/0022; A61C 8/0059; A61C 8/0062;
(Continued)

(56) References Cited

U.S. PATENT DOCUMENTS

| 5,447,434 A | * | 9/1995 | Shaw | A61C 8/005 |
| | | | | 411/924.1 |
| 7,806,685 B1 | * | 10/2010 | Grant | A61C 8/005 |
| | | | | 433/14 |

(Continued)

FOREIGN PATENT DOCUMENTS

| DE | 102009057754 A1 | 6/2011 |
| DE | 102018113237 A1 | 12/2019 |

(Continued)

OTHER PUBLICATIONS

Gadau Implant Solutions "My Ti Base; Gadau Implant Solutions" Mar. 21, 2017.

(Continued)

*Primary Examiner* — Edward Moran
*Assistant Examiner* — Matthew P Saunders
(74) *Attorney, Agent, or Firm* — Jason H. Vick; Amped IP LLC (57) ABSTRACT

A dental implant having an implant body having on an outer side an external thread for fastening the dental implant to a jaw bone and having an opening extending along a longitudinal axis of the dental implant. The opening comprises an internal thread for fastening a superstructure to the dental implant. The implant body further includes an interface for fastening the superstructure to the dental implant, which interface is arranged at a front end of the implant body. The dental implant further has an anti-rotation element which is configured to prevent rotation of the superstructure around the longitudinal axis relative to the dental implant, wherein the anti-rotation element is configured as a component separate from the implant body, which is attached to the implant body in an area of the interface.

18 Claims, 4 Drawing Sheets

(58) Field of Classification Search
CPC ... A61C 8/0066; A61C 8/0075; A61C 8/0051; A61C 8/0009; A61C 8/0028; A61C 8/0054; A61C 8/0069; A61C 8/0078; A61C 5/70
USPC .......................................................... 433/174
See application file for complete search history.

(56) References Cited

U.S. PATENT DOCUMENTS

| | | | |
|---|---|---|---|
| 9,055,988 B2* | 6/2015 | Galgut | A61C 8/0001 |
| 9,277,974 B2 | 3/2016 | Lutz et al. | |
| 2008/0254413 A1* | 10/2008 | Gampert | A61C 13/0009 |
| | | | 433/223 |
| 2010/0209877 A1* | 8/2010 | Hogan | A61C 8/0069 |
| | | | 433/214 |
| 2012/0196250 A1* | 8/2012 | Grant | A61C 8/0048 |
| | | | 433/174 |
| 2013/0017513 A1 | 1/2013 | Lutz et al. | |
| 2014/0302460 A1 | 10/2014 | Cramer Von Clausbruch | |
| 2014/0356813 A1* | 12/2014 | Durr | A61C 8/0062 |
| | | | 433/173 |
| 2017/0354485 A1* | 12/2017 | Chu | A61C 8/0006 |
| 2021/0068932 A1 | 3/2021 | Venanzoni et al. | |
| 2021/0353391 A1* | 11/2021 | Honig | A61C 8/0059 |

FOREIGN PATENT DOCUMENTS

| | | | | |
|---|---|---|---|---|
| WO | WO-2007042875 A1 * | 4/2007 | ........... | A61C 8/0022 |
| WO | WO-2013014643 A2 * | 1/2013 | ......... | A61C 13/0006 |
| WO | WO 2013/110714 A1 | 8/2013 | | |
| WO | WO-2017085725 A1 * | 5/2017 | ........... | A61C 8/0063 |

OTHER PUBLICATIONS

International Search Report for International Application No. PCT/EP2020/055170, mailed Jun. 18, 2020.
Written Opinion for International Application No. PCT/EP2020/055170, mailed Jun. 18, 2020.
International Preliminary Report on Patentability for International Application No. PCT/EP2020/055170, mailed Sep. 10, 2021.
Office Action for corresponding European Application No. 20711052.9, mailed Aug. 30, 2021.

* cited by examiner

DENTAL IMPLANT AND DENTAL PROSTHESIS

CROSS REFERENCE TO RELATED APPLICATIONS

This application is a continuation of international patent application PCT/2020/055170, filed on Feb. 27, 2020 designating the U.S., which international patent application has been published in German language and claims priority from German patent application DE 10 2019 105 182.7, filed on Feb. 28, 2019. The entire contents of these priority applications are incorporated herein by reference.

BACKGROUND

This disclosure relates to a dental implant for use in a dental prosthesis. Further, the disclosure relates to a dental prosthesis comprising the dental implant, a superstructure and a fastening element for fastening the superstructure to the dental implant. Still further, the disclosure relates to a superstructure as counterpart to the dental implant.

The term "dental implant" is colloquially often used inconsistently and often erroneously for the overall structure of a dental prosthesis. Therefore, it should be clarified at this point that a "dental implant" in the medical and present sense only means the implant body, i.e. the artificial tooth root that is implanted in the patient's jaw. Therefore, the term "implant body" is often used instead of the term "dental implant". In the following, however, the term "dental implant" is uniformly used for the aforesaid part of the dental prosthesis.

Conventional dental prostheses of this type comprise a so-called abutment in addition to the dental implant, which abutment acts as a connecting part between the dental implant and the implant crown (superstructure). The abutment forms the sensitive transition through the peri-implant soft tissue to the oral cavity and the superstructure. Such abutments are sometimes referred to as "pillars" or "implant posts". Commonly, abutments are made of titanium, ceramic or ceramic composites such as aluminum oxide or zirconium dioxide ceramic.

The superstructure, i.e. the artificial tooth crown, is typically made of ceramic or a comparable material. Traditionally, the superstructure is made by a dental technician as follows: First, a wax model is created for the artificial tooth crown. Then, the wax model is used to cast the artificial tooth crown. The abutment is manually ground down to the correct size and shape and in the final step the cast artificial tooth crown is mounted on the abutment. In most cases, the assembly is performed by bonding the superstructure to the abutment. This process, which is largely performed manually, allows highly precise results to be achieved. However, it goes without saying that this is time-consuming and therefore also cost-intensive. Additionally, there is an adhesive gap between the superstructure and the abutment, in which the gap is susceptible to leaks and can also limit the durability of the dental prosthesis.

Today there are many efforts to digitize or automate the above-mentioned process as far as possible. The superstructure is now often milled on a milling machine on the basis of a 3D model. In this type of fabrication, the connection geometry for the connection with the abutment is inserted directly into the superstructure on its rear side. The shape and size of the abutment must therefore already be known when the artificial tooth crown is fabricated in order to program the milling machine accordingly. This is usually done by means of a CAD model of the abutment, which is read into the control system of the milling machine.

Since the shape and size of the abutment must be known before fabricating the superstructure, many manufacturers choose a short and small abutment that fits any anatomy. However, in the case of elongated, i.e. comparatively long superstructures, a short and small abutment is biomechanically unsuitable in relation to the superstructure, which may result in loosening or fractures.

Other manufacturers solve this by using many different abutments. Depending on the shape and size of the superstructure, abutments of different sizes or shapes are then used. For example, a different abutment has to be used for an artificial incisor than for an artificial molar tooth. If, for example, the rear flank of the abutment is not beveled when used for an artificial incisor, the abutment would be visible on the rear side of the superstructure, which is undesirable from a purely esthetic point of view. However, this problem may not arise when used for an artificial molar tooth.

In automated fabrication with digital CAD models the manufacturer of the superstructure is usually provided with several CAD data sets that represent the different shapes of the abutments. At the same time, the manufacturer of the superstructure has to keep a large number of abutments of different shapes and sizes in stock. This is often cumbersome and also generates high storage costs.

The disadvantages of the previous approaches can thus be summarized as follows: On the one hand, the use of abutments restricts the freedom of shape and design of the superstructure including its transgingival portion. A non-flexible transgingival portion of the superstructure can cause problems, particularly with soft tissue management. However, ideal soft-tissue management is crucial for an esthetic result and a long-term stable bone level. On the other hand, the material and manufacturing costs for such a dental prosthesis according to the prior art are relatively high. In addition, there is an adhesive gap between the superstructure and the abutment, in which the gap is disadvantageous in many respects.

German patent application with application number 10 2018 113 237.9 discloses a completely new approach in which a dental prosthesis of the above-mentioned type also manages without an abutment, i.e. the superstructure is connected directly to the dental implant. This is made possible in particular by a specially designed interface on the dental implant to which the superstructure can be directly attached. The interface enables a geometrically clearly defined arrangement of the superstructure. This guarantees a clearly defined relative position between the superstructure and the dental implant.

In order to prevent undesired rotation of the superstructure relative to the dental implant, an anti-rotation device is necessary. In the dental implant described in the above-mentioned patent application, this anti-rotation device is achieved by a non-rotationally symmetrical configuration of the said interface on the dental implant and a correspondingly shaped interface on the superstructure as a counterpart.

Although the dental implant described in the above-mentioned patent application has proven to be extremely advantageous, the inventors have set themselves the goal of further improving the anti-rotation device of the dental implant.

SUMMARY

It is an object to provide a dental implant which allows a direct connection to the superstructure without the use of an abutment and in which the anti-rotation device is further improved to prevent rotation of the superstructure relative to the dental implant. In particular, it is an object to reduce the costs for manufacturing the anti-rotation device and thus also the total manufacturing costs of the dental implant.

According to an aspect, a dental implant is provided which comprises an implant body having on an outer side an external thread for fastening the dental implant to a jaw bone and having an opening extending along a longitudinal axis of the dental implant, in which opening an internal thread is arranged for fastening a superstructure to the dental implant. The implant body further comprises an interface for fastening the superstructure to the dental implant, which interface is arranged at a front end of the implant body. The dental implant further comprises an anti-rotation element which is configured to prevent rotation of the superstructure around the longitudinal axis relative to the dental implant. The anti-rotation element is configured as a component separate from the implant body, which is attached to the implant body in the area of the interface.

According to a further aspect, a dental prosthesis is presented, including:
a superstructure;
a dental implant that comprises an implant body having on an outer side an external thread for fastening the dental implant to a jaw bone and having an opening extending along a longitudinal axis of the dental implant, wherein the opening comprises an internal thread for fastening the superstructure to the dental implant, wherein the implant body further comprises an interface for fastening the superstructure to the dental implant, said interface being arranged at a front end of the implant body, wherein the dental implant further comprises an anti-rotation element which is configured to prevent rotation of the superstructure about the longitudinal axis relative to the dental implant, wherein the anti-rotation element is configured as a component separate from the implant body, which is attached to the implant body in an area of the interface; and
a fastening element configured to fasten the superstructure to the dental implant.

The dental implant is therefore constructed in at least two parts. On the one hand, it comprises the implant body at which the external thread is arranged, in which the opening with the internal thread is formed and at the front end of which the interface is arranged. Separately from this implant body, the dental implant comprises the said anti-rotation element, which is configured as a separate, second component and is attached to the implant body in the area of the interface. The anti-rotation element is therefore not formed as an integral part of the implant body in one and the same component, but is produced as a separate component that is subsequently attached to the implant body.

The implant body and the anti-rotation element can thus be produced separately from one another. This has the advantage that particularly the production of the implant body is significantly simplified. Since the anti-rotation element does not have to be incorporated into the interface during production of the implant body, the interface is comparatively easy to produce. Large parts of the interface can be designed to be rotationally symmetrical, so that they can be produced by means of a conventional lathe. The separately manufactured anti-rotation element can also be produced comparatively easily and therefore relatively inexpensively. Hence, the production costs of the dental implant can be reduced compared to a one-piece design of implant body with anti-rotation device.

Furthermore, the separate configuration of the anti-rotation element allows the anti-rotation function to be improved also from a mechanical point of view. The anti-rotation element can be manufactured comparatively larger and more stable than the geometric features which are directly incorporated in the interface in order to ensure the anti-rotation function in case of an integral configuration of the implant body and the anti-rotation element. The anti-rotation feature provided by the separately designed component thus withstands comparatively higher forces and moments.

In a refinement, the anti-rotation element is connected to the implant body in positive-locking or firmly bonded manner.

According to a further refinement, the anti-rotation element is pressed or clamped into the implant body.

This special type of material-locking connection between the anti-rotation element and the implant body is particularly preferred, because it can be realized easily and cost-effectively. Since both the implant body and the anti-rotation element are preferably made of titanium, pressing or clamping the anti-rotation element into the implant body is also advantageous from a mechanical point of view.

According to a further refinement, the interface provided on the implant body comprises a recess in which the anti-rotation element is arranged.

This recess can be produced relatively easily. The anti-rotation element is preferably accommodated in the recess with a precise fit. Preferably, at least one surface of the anti-rotation element rests against at least one correspondingly shaped mating surface of the recess in order to prevent rotation of the anti-rotation element relative to the implant body.

According to a further refinement, the interface arranged on the implant body is, apart from the recess, rotationally symmetrical.

All remaining parts of the interface (except the recess) can therefore be manufactured relatively easily, e.g. by means of a lathe. A rotationally symmetrical body is defined as a body which, after rotation in a plane about an angle of less than 360°, is again congruent with itself.

Preferably, the interface is furthermore mirror symmetrical with respect to a longitudinal sectional plane in which the longitudinal axis of the dental implant lies and which divides the anti-rotation element into two halves of equal size.

The dental implant consisting of the implant body and the anti-rotation element is therefore not rotationally symmetrical, but mirror-symmetrical with respect to the aforementioned longitudinal section plane. Preferably, the dental implant is mirror-symmetrical with respect to the above-mentioned longitudinal section plane, but not with respect to any other plane. This has the advantage that the position of the superstructure relative to the implant body is clearly defined. The superstructure can therefore only be arranged in a single, defined position on the implant body.

According to a further refinement, the interface comprises a convex, rounded curvature that extends over an angular range of at least 90° around the longitudinal axis of the dental implant and that is at least partially interrupted by the recess.

In this refinement, the recess is thus introduced into the convex, rounded curvature. The convex, rounded curvature serves for attaching the superstructure to the dental implant. It absorbs forces in the radial direction, i.e. orthogonally to the longitudinal axis of the dental implant. In addition, the curvature serves for centering.

In the present context, a "convex" curvature is understood to be any outwardly curved curvature. A convex curvature is the opposite of a concave, inwardly curved depression. For clarification purposes only, the convex curvature is also defined as rounded, although the term "convex" already implies such a rounding. The curvature defined as convex and rounded preferably has a continuous slope of the tangent (without "kink").

According to a further refinement, the anti-rotation element protrudes radially inward beyond the curvature.

The anti-rotation element thus protrudes from the recess made in the curvature in the direction of the longitudinal axis of the implant body. The anti-rotation element is therefore preferably larger than the recess made in the convex curvature.

According to a further refinement, the anti-rotation element comprises a pin inserted into a bore arranged in the implant body and a head portion arranged outside the bore.

The bore is preferably configured as a blind bore which opens into the recess at its upper end. The head portion forms the visible part of the anti-rotation element, whereas the pin is inserted into the bore and is thus not visible.

The head portion is preferably the part of the anti-rotation element that projects radially inward beyond the curvature. The head portion therefore preferably has a larger diameter than the pin.

According to a further refinement, the pin of the anti-rotation element is connected to the bore in a positive-locking manner and/or the head portion of the anti-rotation element is arranged in the recess in a positive-locking manner. This prevents rotation of the anti-rotation element relative to the implant body.

The form fit between the pin of the anti-rotation element and the bore located in the implant body can be realized, for example, by the pin having an outer diameter that is larger than an inner diameter of the bore. The pin is thus provided with a slight oversize, so that the connection between pin and bore is designed as an interference fit.

According to a further refinement, the head portion of the anti-rotation element has a convex surface on its upper side.

The convex surface is preferably configured as a cylindrical surface. However, this does not mean that the convex surface forms a complete cylinder, but that the convex surface is a sector or section of a cylindrical lateral surface. In the assembled state of the dental prosthesis, the convex surface of the head portion of the anti-rotation element lies against a correspondingly concave surface on the superstructure, which forms the counterpart to the anti-rotation element.

According to a further refinement, the bore in which the pin of the anti-rotation element is arranged is in parallel offset to the longitudinal axis of the dental implant. The anti-rotation element is therefore arranged eccentrically on the implant body.

According to a further refinement, the interface comprises a support surface arranged radially outwardly relative to the convex curvature, wherein the support surface has at least one annular portion oriented transversely to the longitudinal axis.

The annular portion of the support surface surrounds the convex curvature, i.e. it is arranged radially further outward than the convex curvature. In the present context, "transverse" is understood to mean any type of alignment that is not parallel. "Transverse" can, but does not necessarily need to be orthogonal. Preferably, the annular support surface has all around a constant angle with respect to the longitudinal axis of the dental implant. Preferably this angle is larger than 60°, particularly preferably this angle is a right angle (90°).

The annular portion of the support surface serves to absorb axial forces parallel to the longitudinal axis. This prevents tensile stresses which could lead to fracture of the superstructure. Furthermore, the annular portion of the support surface serves as a boundary or sealing surface to avoid gaps along the circumference between the superstructure and the dental implant, which gaps could occur due to contamination. The annular portion of the support surface therefore preferably forms the radially outermost region of the interface, which surrounds all other regions of the interface including the curvature. The support surface is also preferably arranged radially further outward relative to the anti-rotation element.

The support surface preferably forms an end face arranged on the upper side of the implant body, above which the anti-rotation element does not protrude. Hence, the anti-rotation element is arranged below the support surface.

According to a further refinement, the convex rounded curvature is directly adjacent to the annular portion of the support surface. Preferably, the convex curvature transitions continuously and tangentially into the annular portion of the support surface, which is arranged radially further outward.

According to a further refinement, the curvature extends over an angular range of at least 270° around the longitudinal axis.

According to a further refinement, at least a portion of a radially outer edge of the curvature and at least a portion of a radially inner edge of the curvature each lie on a circular line.

According to a further refinement, the curvature is a circular sector when viewed in a longitudinal section of the dental implant. Preferably, the center angle of the circular sector is 90°. The convexly rounded curvature is thus preferably a quarter circle in longitudinal section.

According to a further aspect, it is provided a superstructure having an opening extending along a longitudinal axis of the superstructure and an interface arranged at a front end of the superstructure for fastening the superstructure to a dental implant, wherein the interface comprises a concave curvature that extends over an angular range of at least 90° around the longitudinal axis and that is interrupted by a recess.

The recess, which is made in the concave curvature, serves as a counterpart to the anti-rotation element of the dental implant.

According to a refinement, the recess is configured as a-tunnel-like that extends in a radial direction orthogonal to the longitudinal axis.

According to a further refinement, the interface comprises a support surface arranged radially outwardly relative to the concave curvature, wherein the support surface has at least one annular portion oriented transversely to the longitudinal axis.

According to a further refinement, a radially outer edge of the concave curvature transitions tangentially into the annular portion of the support surface.

According to a still further aspect, it is-provided is a dental prosthesis, including:
  a dental implant;
  a superstructure that comprises an opening extending along a longitudinal axis of the superstructure, and an interface arranged at a front end of the superstructure for fastening the superstructure to the dental implant, wherein the interface comprises a concave curvature that extends over an angular range of at least 90° around the longitudinal axis and that is interrupted by a recess a fastening element for fastening the superstructure to the dental implant.

It goes without saying that the features referred to above and those yet to be explained below can be used not only in the respective given combinations, but also in other combinations or alone without leaving the spirit and scope of the present disclosure.

DESCRIPTION OF PREFERRED EMBODIMENTS

Figure 1:
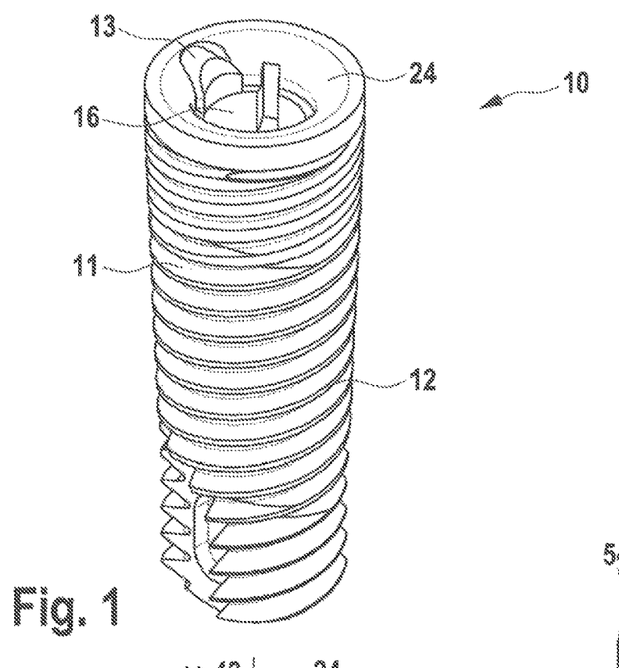
FIG. 1 shows a perspective view of an embodiment of the dental implant.
Figure 4:
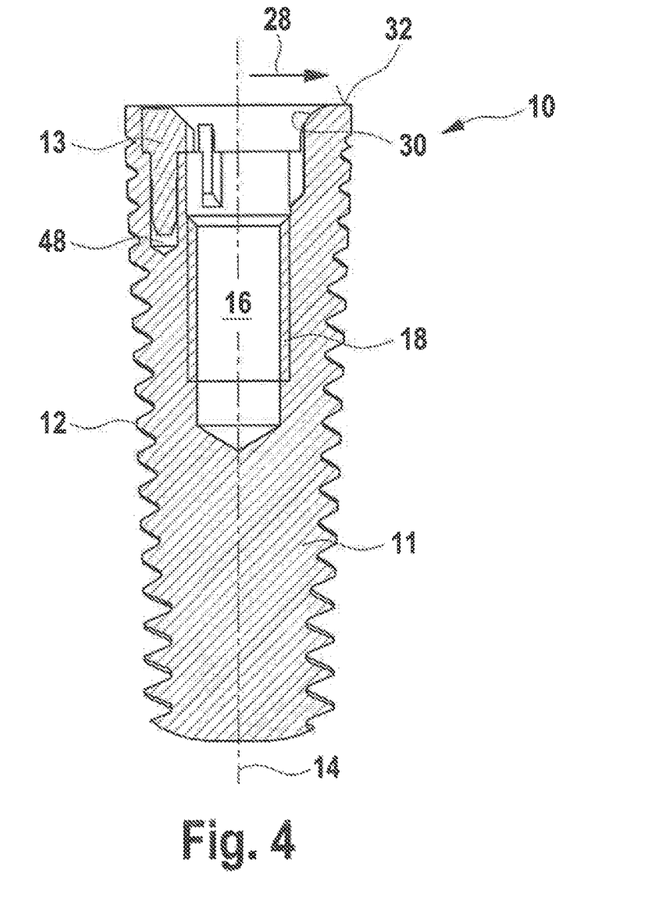
FIG. 4 shows a longitudinal sectional view of the dental implant shown in FIG. 1.
Figure 5:
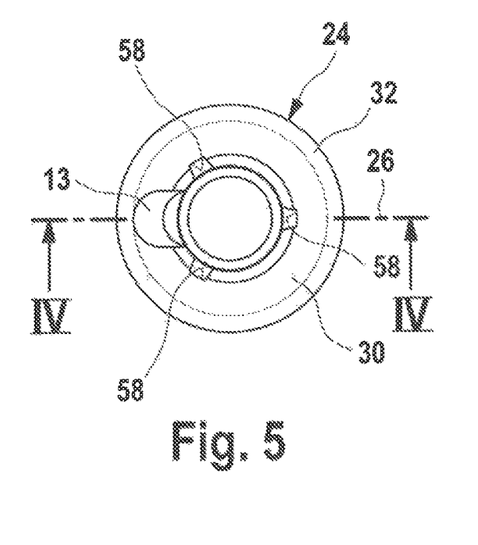
FIG. 5 shows a top view of the dental implant shown in FIG. 1.

FIGS. 1, 4 and 5 show an embodiment of the dental implant in various views. The dental implant is denoted therein in its entirety with the reference numeral 10.

Figure 2:
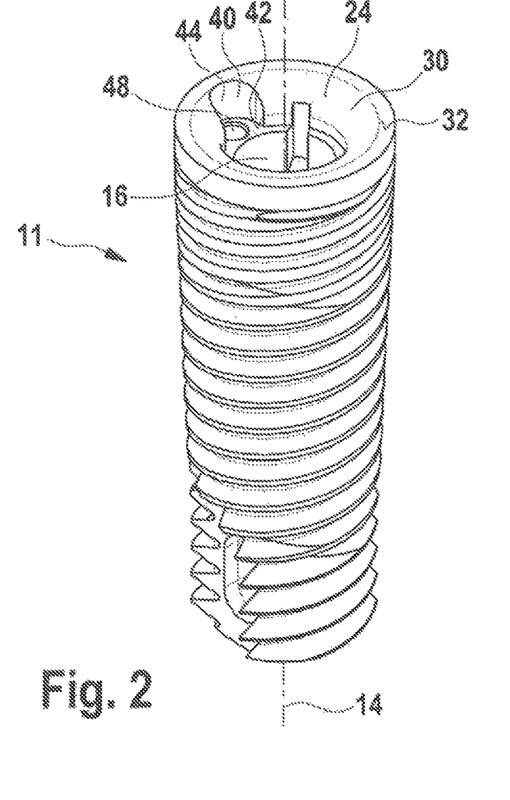
FIG. 2 shows a perspective view of an implant body of the dental implant shown in FIG. 1.

The dental implant 10 is constructed in two parts. It comprises two separate components, an implant body 11 and an anti-rotation element 13 attached thereto. The implant body 11 is shown separately (without the anti-rotation element 13) in FIGS. 2 and 6. The anti-rotation element 13 is shown separately in FIG. 3.

Preferably, both the implant body 11 and the anti-rotation element 13 are made of titanium or zirconium oxide. The anti-rotation element 13 is preferably detachably attached to the implant body 11. The connection between the anti-rotation element 13 and the implant body 11 can be configured as a positive-locking and/or firmly bonded connection. Particularly preferably, the anti-rotation element 13 is pressed or clamped into the implant body 11.

The features of the implant body 11 and the anti-rotation element 13 are in the following first explained individually, before the type of arrangement of the anti-rotation element 13 on the implant body 11 and the type of connection of the two components are then discussed in more detail.

Figure 9:
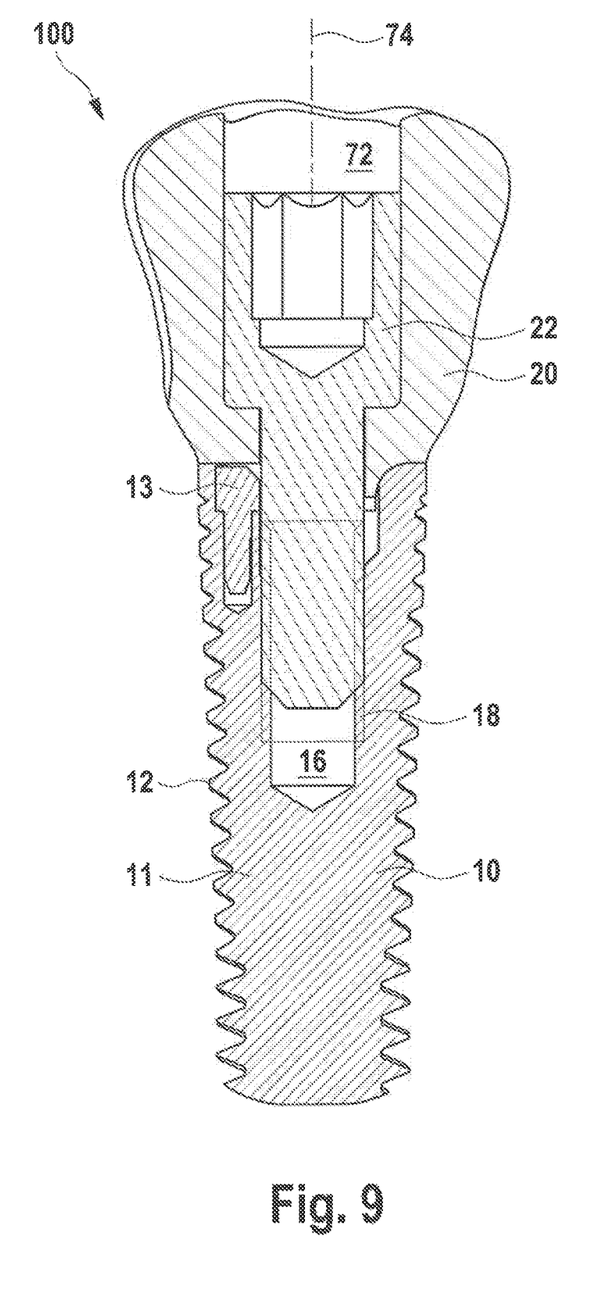
FIG. 9 shows a longitudinal sectional view of a dental prosthesis comprising the dental implant shown in FIG. 1 and the superstructure shown in FIG. 7.

The implant body 11 comprises an external thread 12 on its outer side, by means of which the dental implant 10 can be screwed into a jaw bone of a patient. The implant body 11 extends substantially along a longitudinal axis 14, which can also be referred to as the central axis. Internally, the implant body 11 comprises an opening 16 that extends along the longitudinal axis 14. Preferably, at least a portion of this opening 16 is configured as a bore, particularly preferably as a blind bore (see FIG. 4). An internal thread 18 is arranged in the opening 16. This internal thread 18 serves for attaching a superstructure 20 (artificial tooth crown) to the dental implant 10. A screw 22, which engages in the internal thread 18, is preferably used to attach the superstructure 20 to the dental implant 10 (see FIG. 9).

The implant body 11 comprises an interface 24 at the upper front end. This interface 24 is used for attaching the superstructure 20 to the dental implant 10. The interface 24 forms the abutment surface, so to speak, with which the dental implant 10 contacts the superstructure 20 in the assembled state.

Figure 6:
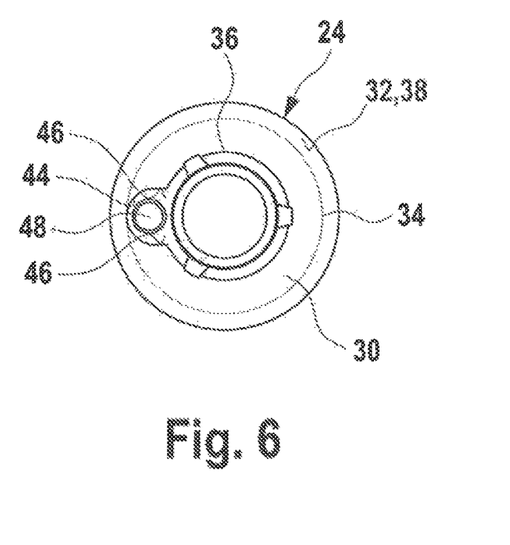
FIG. 6 shows a top view of the implant body shown in FIG. 2.

The interface 24 is shown in detail in a top view in FIG. 5 (with anti-rotation element 13) and FIG. 6 (without anti-rotation element). Due to its shape and design, the interface 24 allows the superstructure 20 to be attached directly to the dental implant 10 (without the use of an interposed abutment). This longitudinal sectional plane 26 is spanned by the longitudinal axis 14 and the radial direction 28 orthogonal thereto. The longitudinal sectional plane 26 divides the anti-rotation element 13 into two halves of equal size.

Apart from the anti-rotation element 13 and its receptacle, which is implemented as a recess in the interface 24, the interface 24 is 120° rotationally symmetrical around the longitudinal axis 14.

The interface 24 has a convex curvature 30 and a support surface 32 surrounding the convex curvature 30. The convex curvature 30 essentially serves to absorb forces in the radial direction 28, whereas the support surface 32 serves as an axial support which essentially absorbs forces in the longitudinal direction, i.e. along the longitudinal axis 14. In the assembled state, the superstructure 20 is supported both on the convex curvature 30 and on the support surface 32.

The convex curvature 30 is rounded, i.e. not angular. The convex curvature 30 extends over an angular range of at least 90° around the longitudinal axis 14. In the illustrated embodiment, the convex curvature 30 extends over an angular range of approximately 360°, that is, almost all the way around. The convex curvature 30 is interrupted only by a recess 40, which serves as a receptacle for the anti-rotation element 13.

Viewed in a cross-section (see FIG. 4), the curvature 30 is preferably configured as a circular sector with a center angle of 90°. It thus forms a quarter circle in cross-section. It is understood, however, that the convex curvature 30 does not necessarily have to be circular in cross-section. It can also be elliptically shaped or configured as a free-form surface.

The outer edge 34 and the inner edge 36 of the curvature 30 preferably lie on a circular line. In the top view shown in FIG. 6, the curvature 30 is, at least in sections, circular. Accordingly, the curvature 30 forms part of the surface of a torus.

Preferably, the convex curvature 30 is immediately adjacent to the opening 16. Preferably, the outer edge 34 of the convex curvature 30 directly adjoins an annular portion 38 of the support surface 32. This annular portion 38 extends transversely, preferably at an angle >60°, particularly preferably (as also shown in FIG. 4) orthogonally to the longitudinal axis 14 of the dental implant 10. This annular portion 38 of the support surface 32 preferably forms the upper end surface of the implant body 11. The annular portion 38 of the support surface 32 preferably transitions tangentially into the convex curvature 30.

The anti-rotation element 13 is, as previously mentioned, arranged in a recess 40 provided in the interface 24. The recess 40 is formed as a pocket-shaped recess in the convex curvature 30. The anti-rotation element 13 is preferably arranged in the recess 40 in a perfectly fitting manner. The recess 40 has an axial support surface 42 and a side wall 44 at least partially surrounding the axial support surface 42. The axial support surface 42 is preferably oriented orthogonally to the longitudinal axis 14 of the implant body 11. The side wall 44 extends transversely, preferably orthogonally to the axial support surface 42. The side wall 44 is preferably concave in shape. At its two lateral ends, the side wall 44 comprises two opposing planar abutment surfaces 46 (see FIG. 6).

Furthermore, a bore 48 is provided in the implant body 11 into which the anti-rotation element 13 can be inserted. The bore 48 is in parallel offset to the longitudinal axis 14. It merges into the recess 40. The anti-rotation element 13 is arranged in both the bore 48 and in the recess 40, preferably in a positive locking manner, in order to prevent the anti-rotation element 13 from pivoting or even rotating around its longitudinal axis relative to the implant body 11.

Figure 3:
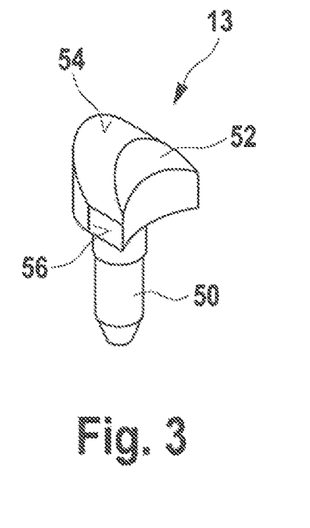
FIG. 3 shows a perspective view of an anti-rotation element of the dental implant shown in FIG. 1.

The anti-rotation element 13 is shown in detail in FIG. 3. It comprises a pin 50 and a head portion 52 arranged on the upper side of the pin 50. In the assembled state of the anti-rotation element 13, the pin 50 is arranged in the bore 48. The head portion 52, on the other hand, is arranged outside the bore 48 in the recess 40. The head portion 52 therefore has a larger diameter than the pin 50. The head portion 52 and the pin 50 are preferably integrally connected to each other.

On its upper side, the head portion 52 of the anti-rotation element 13 comprises a convex surface 54. This convex surface 54 is preferably cylindrical. However, it can also be curved in a different way. In the mounted state of the dental prosthesis, the convex surface 54 is preferably in contact with the superstructure 20.

Laterally, the head portion 52 of the anti-rotation element 13 comprises two planar, opposing abutment surfaces 56, wherein only one of these two abutment surfaces 56 is visible in FIG. 3. In the assembled state, these two abutment surfaces 56 rest against the planar abutment surfaces 46 of the recess 40. The abutment surfaces 46 as well as the abutment surfaces 56 preferably extend parallel to each other.

As can be seen in particular from FIGS. 4 and 5, the anti-rotation element 13 projects radially inward beyond the convex curvature 30. Also, a portion of the planar abutment surfaces 56 of the head portion 52 of the anti-rotation element 13 protrudes inwardly beyond the side wall 44 or the planar abutment surfaces 46. The planar abutment surfaces 56 of the head portion 52 therefore not only abut the side wall 44 or the abutment surfaces 46 on the implant body 11, but also abut correspondingly shaped mating surfaces on the superstructure 20.

Also shown in FIGS. 5 and 6 are a total of three elongated recesses 58 arranged adjacent to the opening 16 and formed in the inner wall of the implant body 11. These recesses 58 serve as a tool engagement for a tool used to screw the dental implant 10 into the jaw bone of a patient.

Figure 7:
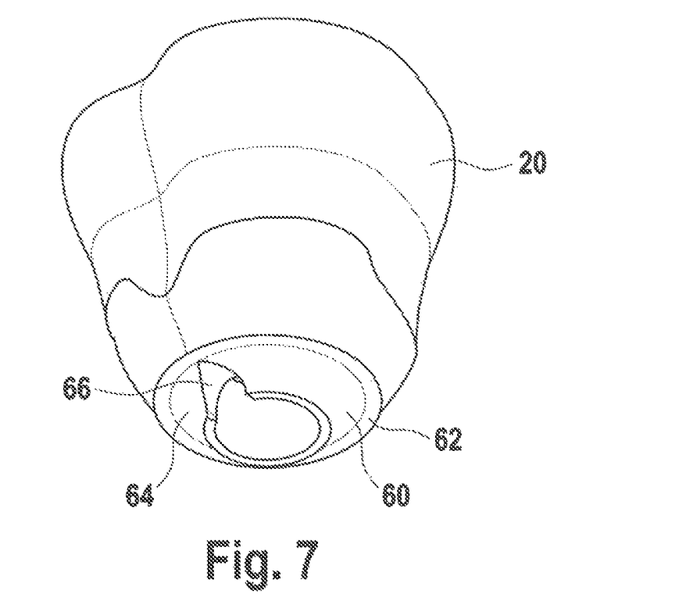
FIG. 7 shows a perspective view of a superstructure that also fits the dental implant shown in FIG. 1.
Figure 8:
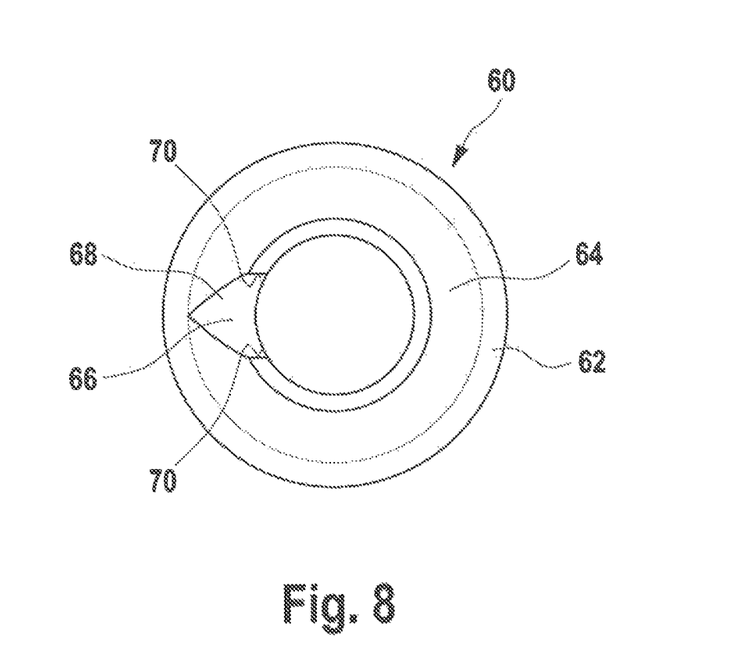
FIG. 8 shows a top view from below of the superstructure shown in FIG. 7.

FIGS. 7 and 8 show an exemplary superstructure 20. Inside the superstructure 20 is an opening 72, which in the state shown here is configured as a through-hole. The opening 72 extends along a longitudinal axis 74. The upper end of this through-hole is closed after the dental prosthesis 100 has been mounted on the patient. An interface 60 is arranged on the lower side of the superstructure 20, which interface serves as a counterpart to the interface 24 arranged on the dental implant 10. The interface 60 is shown in detail in a top view in FIG. 8.

The interface 60 comprises an annular support surface 62. The annular support surface 62 forms the radially outermost part of the interface 60, serving as a counterpart to the annular support surface 32, 38.

Furthermore, the interface 60 comprises a concave curvature 64 that is immediately adjacent to the annular support surface 62. The concave curvature 64 serves as a counterpart to the convex curvature 30 of the interface 24 arranged on the implant body 11. The concave curvature 64 projects downwardly relative to the support surface 62. The outer edge of the concave curvature 64 preferably transitions tangentially into the support surface 62.

A tunnel-like recess 66 provided at the interface 60 acts as a counterpart to the anti-rotation element 13. This tunnel-like recess 66 is provided in the concave curvature 64. In other words, the concave curvature 64 is interrupted by the tunnel-like recess 66. The tunnel-like recess 66 has a concave abutment surface 68 and two planar abutment surfaces 70. The planar abutment surfaces 70 are each adjacent to the concave abutment surface 68. The planar abutment surfaces 70 are arranged opposite to each other and preferably run parallel to each other.

The shape of the tunnel-like recess 66 is adapted to the shape of the head portion 52 of the anti-rotation element 13. In the assembled state, the planar abutment surfaces 56 of the anti-rotation element 13 lie against the planar abutment surfaces 70 of the tunnel-like recess 66. In contrast, the convex surface 54 of the anti-rotation element 13 rests at least partially against the concave abutment surface 68 of the tunnel-like recess 66. The latter is not necessarily necessary. The force transmission between the anti-rotation element 13 and the superstructure 20 can also take place only via the planar abutment surfaces 56 or 70. The axial force transmission between superstructure 20 and dental implant 10 takes place via the annular abutment surfaces 38, 62. The radial force transmission between superstructure 20 and dental implant 10 takes place via the contact of the curvatures 30, 64.

As already mentioned, the design of the interfaces 24 and 60 enables clear positioning of the superstructure 20 relative to the dental implant 10. Furthermore, it enables a stable and tight direct connection between the superstructure 20 and the dental implant 10. In addition, the interfaces 24, 60 can be manufactured comparatively simply, automatically and thus inexpensively. The described shape of the interfaces 24, 60 satisfies all mechanical requirements for a direct connection of titanium (typical material from which the dental implant 10 is made) and ceramic (typical material from which the superstructure 20 is made). Incidentally, the described shape of the interfaces 24, 60 also satisfies the requirements for a direct connection of titanium to titanium, for a case in which both the superstructure 20 and the dental implant 10 are made of titanium. In addition, the interfaces 24, 60 are suitable for the manufacturing process mentioned at the beginning, in which the superstructure 20 is manufactured automatically on the basis of a CAD model (for example, by machining or additive manufacturing processes).

The separate design of the anti-rotation element 13 as a separate component, which can be arranged in the implant body 11 and is not integrally connected to it, also simplifies the production of the interface 24 arranged in the implant body 11. The implant body 11 and the anti-rotation element 13 can be produced relatively inexpensively as separate components and only subsequently connected to each other.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A dental implant, comprising:
   an implant body having on an outer side an external thread configured to fasten the dental implant to a jaw bone and having an opening extending along a longitudinal axis of the dental implant, wherein the opening comprises an internal thread configured to fasten a superstructure to the dental implant, wherein the implant body further comprises an interface configured to fasten the superstructure to the dental implant, said interface being arranged at a front end of the implant body, and
   an anti-rotation element which is configured to prevent rotation of the superstructure about the longitudinal axis relative to the dental implant, wherein the anti-rotation element is configured as a component separate from the implant body, which is attached to the implant body in an area of the interface,
   wherein the interface comprises a convex curvature and a recess in which the anti-rotation element is arranged, wherein the convex curvature is convexly rounded in a longitudinal cross section along the longitudinal axis of the dental implant, extends over an angular range of at least 90° around the longitudinal axis, and is at least partially interrupted by the recess,
   wherein the anti-rotation element comprises a pin inserted into a bore arranged in the implant body and a head portion arranged outside the bore, wherein the head portion has a larger diameter than the pin, wherein the pin and the head portion are integrally connected to each other, and wherein the head portion comprises a convex surface and two planar abutment surfaces arranged on opposite sides of the convex surface.

2. The dental implant according to claim 1, wherein the anti-rotation element is connected to the implant body in a positive-locking or bonded manner.

3. The dental implant according to claim 1, wherein the anti-rotation element is pressed into the implant body or clamped in the implant body.

4. The dental implant according to claim 1, wherein the interface is, apart from the recess, rotationally symmetrical.

5. The dental implant according to claim 1, wherein the interface is mirror symmetrical with respect to a longitudinal sectional plane in which the longitudinal axis lies and which divides the anti-rotation element into two halves of equal size.

6. The dental implant according to claim 1, wherein the anti-rotation element protrudes radially inward beyond the curvature.

7. The dental implant of claim 1, wherein the pin has an outer diameter that is larger than an inner diameter of the bore.

8. The dental implant according to claim 1, wherein the bore is in parallel offset to the longitudinal axis.

9. The dental implant according to claim 1, wherein the interface comprises a support surface arranged radially outwardly relative to the convex curvature, wherein the support surface has at least one annular portion oriented transversely to the longitudinal axis.

10. The dental implant of claim 9, wherein the support surface is arranged radially outwardly relative to the anti-rotation element.

11. A dental prosthesis, including:
    a superstructure;
    a dental implant that comprises an implant body having on an outer side an external thread configured to fasten the dental implant to a jaw bone and having an opening extending along a longitudinal axis of the dental implant, wherein the opening comprises an internal thread configured to fasten the superstructure to the dental implant, wherein the implant body further comprises an interface configured to fasten the superstructure to the dental implant, said interface being arranged at a front end of the implant body, wherein the dental implant further comprises an anti-rotation element which is configured to prevent rotation of the superstructure about the longitudinal axis relative to the dental implant, wherein the anti-rotation element is configured as a component separate from the implant body, which is attached to the implant body in an area of the interface, wherein the interface comprises a convex curvature and a recess in which the anti-rotation element is arranged, wherein the convex curvature is convexly rounded in a longitudinal cross section along the longitudinal axis of the dental implant, extends over an angular range of at least 90° around the longitudinal axis, and is at least partially interrupted by the recess, wherein the anti-rotation element comprises a pin inserted into a bore arranged in the implant body and a head portion arranged outside the bore, wherein the head portion has a larger diameter than the pin, wherein the pin and the head portion are integrally connected to each other, and wherein the head portion comprises a convex surface and two planar abutment surfaces arranged on opposite sides of the convex surface; and
    a fastening element configured to fasten the superstructure to the dental implant.

12. A superstructure, comprising:
    an opening extending inside the superstructure from a front end of the superstructure along a longitudinal axis of the superstructure; and
    an interface configured to fasten the superstructure to a dental implant; wherein the interface comprises a concave curvature, wherein the concave curvature is arranged on an outside of the superstructure, faces away from the longitudinal axis, extends over an angular range of at least 90° around the opening, and is interrupted by a recess arranged at and opening towards the front end,
    where the recess comprises a concave surface and two planar abutment surfaces arranged on opposite sides of the concave surface, and wherein the planar abutment surfaces run parallel to each other.

13. The superstructure of claim 12, wherein the recess is a tunnel-like recess that extends in a radial direction orthogonal to the longitudinal axis and forms a through-opening from the inside of the superstructure to the outside of the superstructure.

14. The superstructure of claim 12, wherein the interface comprises a support surface arranged radially outwardly relative to the concave curvature, wherein the support surface has at least one annular portion oriented transversely to the longitudinal axis.

15. The superstructure of claim 14, wherein a radially outer edge of the concave curvature transitions tangentially into the annular portion of the support surface.

16. A dental prosthesis, including:
a dental implant;
a superstructure that comprises an opening extending inside the superstructure from a front end of the superstructure along a longitudinal axis of the superstructure, and an interface configured to fasten the superstructure to the dental implant, wherein the interface comprises a concave curvature, wherein the concave curvature is arranged on an outside of the superstructure, faces away from the longitudinal axis, extends over an angular range of at least 90° around the opening, and is interrupted by a recess arranged at and opening towards the front end, where the recess comprises a concave surface and two planar abutment surfaces arranged on opposite sides of the concave surface, and
wherein the planar abutment surfaces run parallel to each other; and
a fastening element configured to fasten the superstructure to the dental implant.

17. The dental implant according to claim 1, wherein the curvature comprises a circular sector in the longitudinal cross section.

18. The superstructure of claim 12, wherein the interface comprises an end surface that surrounds the opening at the front end and is oriented transversely to the longitudinal axis, wherein the end surface is interrupted by the recess.

* * * * *